US012360247B1

(12) United States Patent
Gu et al.

(10) Patent No.: US 12,360,247 B1
(45) Date of Patent: Jul. 15, 2025

(54) PARTIAL SENSOR DATA PROCESSING FOR LATENCY REDUCTION

(71) Applicant: Zoox, Inc., Foster City, CA (US)

(72) Inventors: Tonghan Gu, Fremont, CA (US); Scott M. Purdy, Lake Forest Park, WA (US)

(73) Assignee: Zoox, Inc., Foster City, CA (US)

( * ) Notice: Subject to any disclaimer, the term of this patent is extended or adjusted under 35 U.S.C. 154(b) by 435 days.

(21) Appl. No.: 17/733,560

(22) Filed: Apr. 29, 2022

(51) Int. Cl.
*G01S 17/931* (2020.01)
*B60W 60/00* (2020.01)
*G01S 7/481* (2006.01)

(52) U.S. Cl.
CPC .......... *G01S 17/931* (2020.01); *G01S 7/4817* (2013.01); *B60W 60/0015* (2020.02); *B60W 2420/408* (2024.01)

(58) Field of Classification Search
CPC ......... B60W 60/0015; B60W 2420/408; G01S 17/931; G01S 7/4817
See application file for complete search history.

(56) References Cited

U.S. PATENT DOCUMENTS

| 9,897,687 | B1 * | 2/2018 | Campbell | G01S 17/89 |
| 10,274,588 | B2 * | 4/2019 | Smits | G01S 17/10 |
| 11,840,258 | B2 * | 12/2023 | Shalev-Shwartz | G06T 7/70 |
| 2011/0219131 | A1 * | 9/2011 | Allen | H04W 4/00 709/228 |
| 2017/0131387 | A1 * | 5/2017 | Campbell | G01S 17/89 |
| 2018/0039283 | A1 * | 2/2018 | Srivastava | B60W 40/13 |
| 2020/0111358 | A1 * | 4/2020 | Parchami | G05D 1/028 |
| 2020/0150228 | A1 * | 5/2020 | Kapusta | G01S 17/10 |
| 2021/0124351 | A1 * | 4/2021 | Chen | G01S 13/865 |
| 2022/0066456 | A1 * | 3/2022 | Ebrahimi Afrouzi | G06F 3/04883 |
| 2022/0182213 | A1 * | 6/2022 | Han | G01C 21/28 |
| 2022/0187841 | A1 * | 6/2022 | Ebrahimi Afrouzi | G05D 1/0274 |
| 2023/0367833 | A1 * | 11/2023 | Kol | H04L 63/0227 |
| 2024/0069172 | A1 * | 2/2024 | Kapusta | G01S 7/4808 |

* cited by examiner

*Primary Examiner* — Daniel L Greene
*Assistant Examiner* — Robert L Pinkerton
(74) *Attorney, Agent, or Firm* — Lee & Hayes, P.C.

(57) ABSTRACT

Techniques for reducing latency associated with temporal sensor data processing. The techniques may include determining a region of interest within a field of view of a temporal sensor (e.g., rotating lidar sensor, rolling shutter camera, etc.). Based at least in part on determining the region of interest, an azimuth angle associated with a partial scan of the temporal sensor may be determined such that the region of interest is disposed within the azimuth angle. The techniques may also include receiving sensor data from the temporal sensor and determining whether the sensor data corresponds with the azimuth angle/region of interest. Based at least in part on a determination that the sensor data corresponding with the azimuth angle/region of interest has been received, the sensor data may be processed prior to at least one of receiving additional sensor data or a completion of a full scan by the temporal sensor.

20 Claims, 10 Drawing Sheets

PARTIAL SENSOR DATA PROCESSING FOR LATENCY REDUCTION

BACKGROUND

Sensors can be used in various applications for data generation. Many of today's sensors are either instantaneous sensors that capture data instantaneously or temporal sensors that capture data over a period of time. In contrast to instantaneous sensors, however, temporal sensors can commonly experience latency-related issues when they are used to capture information about dynamic scenes.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
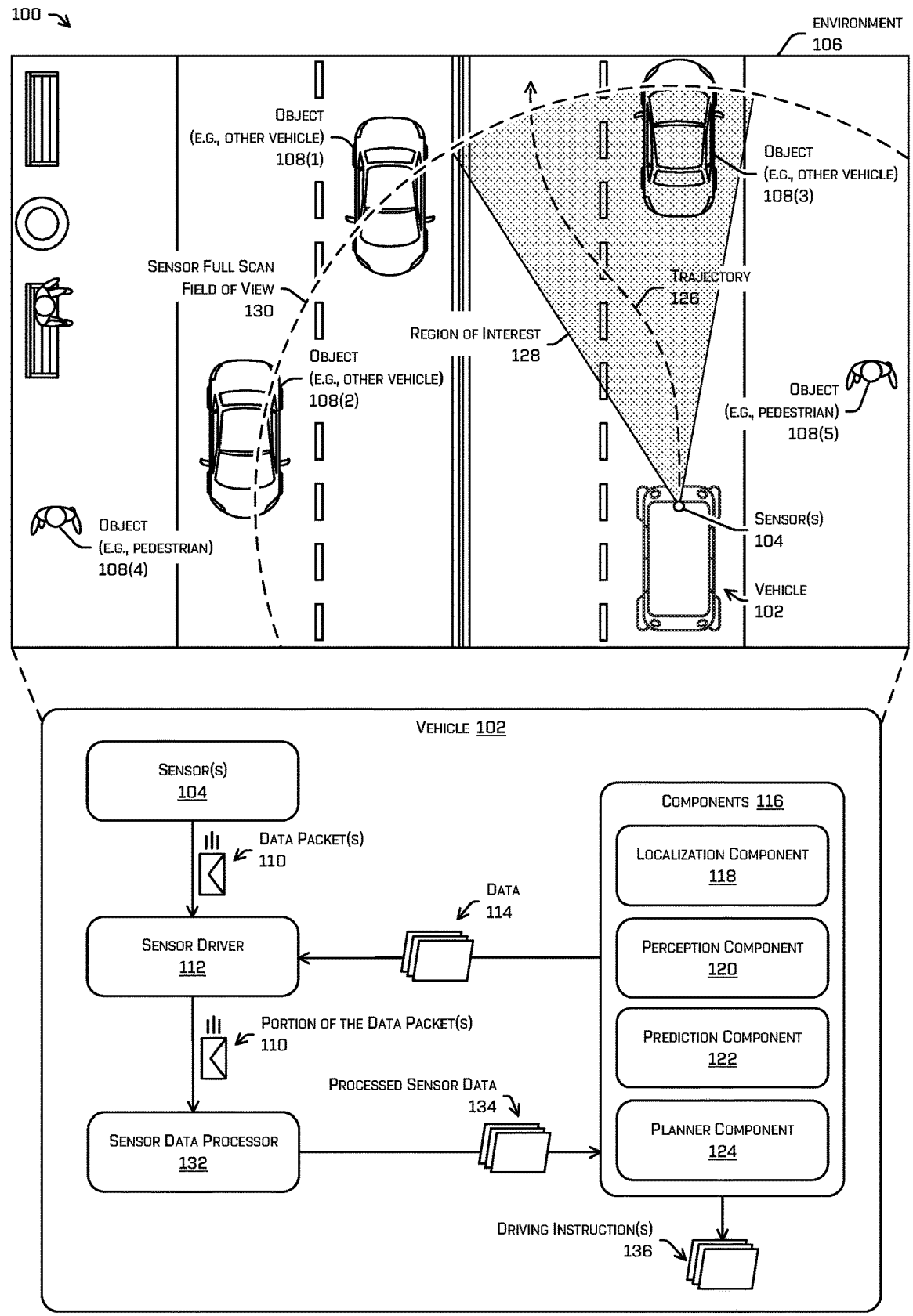
FIG. 1 is a pictorial flow diagram illustrating an example process according to the technologies described herein for partial processing of sensor data for latency reduction.

As noted above, instantaneous and temporal sensors can be used in various applications for data generation. However, temporal sensors can commonly experience latency-related issues in many of the scenarios in which they are utilized in today. Take, for example, a temporal sensor (e.g., rotating lidar sensor, spinning radar sensor, rolling shutter image sensor, etc.) that generates sensor data by scanning an area over a period of time. In such scenarios, it is not uncommon for a full scan of the temporal sensor (e.g., a complete, 360-degree rotation of a rotating lidar sensor) to take 100 milliseconds or more. During this time, fast moving dynamic objects in the scene being scanned may have moved. Furthermore, in at least some examples, the downstream devices that process this temporal sensor data may be configured to begin processing only when a full scan has been completed and all of the sensor data corresponding with the full scan has been received by the processing device.

This application describes technologies that, among other things, reduce latencies associated with processing temporal sensor data. For example, instead of refraining from processing sensor data until a full, temporal scan has been completed and all of the sensor data has been received, a determination can be made to process various portions of the sensor data immediately, as well as to refrain from processing other portions of the sensor data, if desired. For instance, if a determination is made that a specific region within a field of view of a sensor is of greater importance than another region (e.g., based on a previous scan of the temporal sensor, based on input form a different sensor system, based on a tracking system that tracks location of objects in an environment, based on a prediction system that predicts motion of objects, based on a speed of the system through an environment, etc.), the sensor data associated with the specific region may be processed as soon as the sensor data is received, instead of waiting for completion of a full scan that includes the other, less important region. Additionally, in some examples, the sensor data corresponding with regions that are determined to be less important can be discarded from processing or, in some cases, processed at a lower frequency (e.g., every other scan, every third scan, etc.). According to the disclosed techniques, latencies associated with processing sensor data can be reduced, and processing capacity/compute can be increased by reducing the amount of sensor data to be processed regularly.

By way of example, and not limitation, a method according to the technologies described herein may include techniques of determining a region of interest in an environment in which a vehicle is operating. In some examples, the region of interest may be determined based at least in part on one or more of a planned trajectory of the vehicle, a location of an object (e.g., another vehicle, a pedestrian, a cyclist, etc.) detected in the environment, a prediction associated with the object, a geolocation and/or pose of the vehicle, an event detected in the environment (e.g., an accident, emergency lights, construction zone, etc.), an occlusion associated with a sensor of the vehicle, and/or the like. In some examples, the region of interest may be determined based at least in part on one or more of perception data received from a perception component of the vehicle, planning data received from a planner component of the vehicle, localization data received from a localization component of the vehicle, and/or prediction data received from a prediction component of the vehicle.

In some examples, the vehicle may be an autonomous vehicle, a semi-autonomous vehicle, or a non-autonomous vehicle. In some examples, the vehicle may include one or more sensor(s) for capturing data associated with the environment. In examples, the sensor(s) may include temporal sensors that scan the environment proximate the vehicle over a period of time, such as lidar sensor(s), radar sensor(s), rolling shutter image sensor(s), or other temporal sensors and/or instantaneous sensors that capture data of a scene or region of the environment by aggregating data over a time period into a single full scan for further processing. In some examples, when sensor data is received from the sensor(s), the sensor data may be received in a series of data packets (e.g., UDP packets, TCP packets, IP packets, etc.). That is, when sensor data is received for a scan of a sensor, the sensor data associated with a full scan of the sensor may be partitioned into multiple different packets of the series of data packets. For instance, a first data packet may include first sensor data associated with a first field of view of the sensor (e.g., a first range of azimuth angles of a rotating lidar sensor), a second data packet may include sensor data associated with a second field of view of the sensor (e.g., a second range of azimuth angles of the rotating lidar sensor), and so forth.

In some examples, the techniques may include determining a first field of view of a sensor of the vehicle that is directed towards the region of interest. In some examples, the first field of view may be distinguishable form a second field of view of the sensor that does not include the first field of view (e.g., is directed toward another region). In some examples, the first field of view may be less than a complete field of view of the sensor. For instance, the complete field of view of the sensor may include, in some examples, a combination of the first field of view; the second field of view, and one or more additional fields of view. In some instances, if the sensor is a rotating lidar sensor, determining the first field of view may comprise determining a range of azimuth angles associated with the rotating lidar sensor that encompasses the region of interest.

The techniques may also include, in some examples, receiving sensor data associated with the first field of view. For instance, the sensor data may be received from the sensor of the vehicle in a series of data packets. In some instances, the sensor data may be received at a sensor driver associated with the sensor. The sensor driver may, in some examples, be configured to continuously receive the sensor data, continuously determine regions of interest in the environment, and, when some or all of the sensor data has been received corresponding with a region of interest, the sensor driver may cause that sensor data to be processed immediately. As such, in some examples, the techniques may include determining whether all of the sensor data associated with the first field of view has been received. In some examples, determining whether all of the sensor data associated with the first field of view has been received may comprise determining whether all of the data packets associated with the first field of view have been received.

In some examples, the techniques may include causing the sensor data associated with the first field of view to be processed prior to receiving additional sensor data associated with the second field of view. Additionally, or alternatively, the sensor data may be processed prior to the sensor completing a full scan. In some examples, causing the sensor data to be processed may be performed partially responsive to determining that all of the sensor data associated with the first field of view has been received. In some examples, causing the sensor data to be processed comprises sending the sensor data to a perception component associated with the vehicle.

In some examples, based at least in part on causing the sensor data associated with the first field of view to be processed, an operation of the vehicle may be confirmed or modified. Additionally, causing the sensor data associated with the first field of view to be processed prior to receiving the additional sensor data may reduce a latency associated with confirming or modifying of the operation of the vehicle. That is, the operation of the vehicle may be either confirmed or modified in less time than if the sensor data was to be processed only after a complete scan was made by the sensor.

In some examples, an angle of the sensor beams or emitters may be narrowed or widened to prioritize a nearby region of interest and/or to get higher resolution sensor data for a distant region of interest. In some examples, the vehicle may include a rotating platform with multiple sensors coupled to the rotating or stationary platform and, based at least in part on identifying a region of interest, some or all of the multiple sensors may be directed towards the region of interest.

Another aspect of this disclosure is directed to actively and, in real-time, determining regions of interest in an environment for directed sensor processing to reduce latency. By way of example, and not limitation, a method according to the technologies described herein may include techniques of receiving first data associated with a vehicle operating in an environment, the vehicle configured to traverse the environment based at least in part on sensor data received from a sensor of the vehicle.

In some examples, the techniques may include determining a region of interest in the environment based at least in part on the first data. In some examples, the first data may be perception data and the region of interest may be determined based at least in part on the perception data indicating a presence of an object within the region of interest. Additionally. or alternatively, the first data may be localization data indicating a location and pose of the vehicle in the environment, and the region of interest may be determined based at least in part on the location and pose of the vehicle. Additionally, or alternatively, the first data may be planner data indicating a planned trajectory of the vehicle, and the region of interest may be determined based at least in part on the planned trajectory. For instance, a horizon in front of (or behind) a vehicle that the vehicle may prioritize can be based on a speed of the vehicle. As the vehicle slows down, it may focus more to an area closer to the vehicle instead of ahead of it (e.g., below the horizon versus above the horizon). Additionally, in some instances, a region of interest may be focused on areas where pedestrians or children are present. As another example, a region of interest may be based on a presence of a school zone or crosswalk. As yet another example, a region of interest may focus on a right lane when turning left into the lane to reduce the chance of a collision. Additionally, or alternatively, a region of interest may be based on a heatmap indicative of locations where traffic incidents are more frequent.

In some examples, a portion of a full scan field of view of the sensor that encompasses the region of interest may be determined. In some examples, the sensor may be a rotating lidar sensor and determining the portion of the field of view that encompasses the region of interest may comprise determining a range of azimuth angles associated with a partial scan of the rotating lidar sensor that encompasses the region of interest.

In some instances, a parameter of a sensor component (e.g., sensor driver or firmware) associated with the sensor may be altered such that the sensor component outputs sensor data associated with the portion of the field of view at a lower latency or higher frequency than other sensor data associated with another field of view of the sensor. Additionally, or alternatively, altering the parameter of the sensor component may cause the sensor component to refrain from collecting and/or outputting the other sensor data for one or more consecutive scans of the sensor. In other words, some portions of a full scan field of view may be scanned at different frequencies from others. In some examples, parameters of other components (e.g., planner component, prediction component, perception component, etc.) of the system can be altered in addition to, or alternatively to, the sensor component.

In some examples, a priority associated with the region of interest may be determined, and outputting the sensor data at the lower latency than the other sensor data may be based at least in part on the priority associated with the region of interest being greater than another priority associated with another region of interest within the field of view of the sensor. In some instances, the priority associated with the region of interest may be determined based at least in part on one or more of a distance between the vehicle and the region of interest, a size of the region of interest, a planned trajectory of the vehicle, a presence of an object in the region of interest, and/or the like.

In some examples, a region of interest in an environment may be prioritized for sensor data processing based at least in part on a planned trajectory of the vehicle, in addition to the region being at least partially occluded. For instance, if a planned trajectory of the vehicle intersects with an occluded region in the environment, then the sensor data associated with that occluded region may be processed at a higher frequency than other regions. Additionally, in some instances, regions of interest in the environment may correspond with intersections (e.g., four way stops, etc.), construction zones, school zones, crosswalks, or the like. Additionally, or alternatively, sensor data associated with a region immediately proximate to the occluded region may be prioritized.

According to the techniques described herein, several advantages in computer-related technology may be realized. For instance, by processing sensor data associated with regions of interest in an environment prior to a sensor completing a full scan, a latency associated with processing the sensor data for that region of interest can be reduced. Additionally, by identifying regions of interest in an environment that are to be prioritized, less processing power and compute cycles are used to process sensor data, as the sensor data associated with non-prioritized regions/fields of view can be discarded, processed less frequently (e.g., every other scan, every third scan, etc.), or the like. This improves the functioning of computing devices by freeing up resources to be used for other tasks. Other improvements in computer-related technology will be apparent to those having skill in the art.

Additionally, the techniques described herein improve the safe operation of autonomous vehicles. For instance, by reducing latencies associated with processing sensor data, operations of the vehicle can be confirmed or modified in less time. For instance, because the sensor data is processed sooner and passed on to downstream components/devices sooner, those downstream components/devices can make faster/more timely decisions for controlling operation of the autonomous vehicle. In some instances, waiting for a complete scan of a sensor can delay processing of the sensor data by upwards of 100 milliseconds or more. In the context of an autonomous vehicle or other device that can be traveling at high velocities or in the context of devices that capture data associated with fast moving objects in the environment, 100 milliseconds can be a significant amount of time. Thus, not waiting for a full scan improves safety and reaction time for autonomous vehicles, and improves other temporal sensor techniques.

The techniques described herein can be implemented in a number of ways. Example implementations are provided below with reference to the following figures. Example implementations are discussed in the context of autonomous vehicles; however, the methods, apparatuses, and components described herein can be applied to a variety of components (e.g., a sensor component or a robotic platform), and are not limited to autonomous vehicles. For example, the techniques can be utilized in semi-autonomous vehicles, driver assistance systems for manually driven vehicles, aviation or nautical contexts, manufacturing contexts, or in other contexts employing temporal sensor systems. Furthermore, the techniques described herein can be used with real data (e.g., captured using sensor(s)), simulated data (e.g., generated by a simulator), or any combination of the two.

FIG. 1 is a pictorial flow diagram illustrating an example process 100 according to the technologies described herein for partial processing of sensor data for latency reduction. In examples, the vehicle 102 may include one or more sensor(s) 104. In at least one example, the sensor(s) 104 may capture sensor data associated with an environment 106 surrounding the vehicle 102. The environment 106 may include one or more objects, such as the objects 108(1)-108(3) the represent other vehicles and the objects 108(4) and 108(5) that represent pedestrians, and/or other objects (e.g., cyclists, animals, vegetation, buildings, streetlights, etc.). In at least one example, the sensor(s) 104 may include lidar sensors (e.g., rotating lidar sensors), radar sensors, rolling shutter image sensors, ultrasonic transducers, sonar sensors, location sensors (e.g., global positioning component (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), time of flight (ToF) sensors, etc. The sensor(s) may generate sensor data associated with the environment 106, which may include, but is not limited to, lidar data, radar data, ultrasonic transducer data, sonar data, location data (e.g., global positioning component (GPS), compass, etc.), pose data, inertial data (e.g., inertial measurement units data, accelerometer data, magnetometer data, gyroscope data, etc.), image data (e.g., RGB data, IR data, intensity data, depth data, etc.), wheel encoder data, microphone data, environment sensor data (e.g., temperature sensor data, humidity sensor data, light sensor data, pressure sensor data, etc.), ToF sensor data, etc. In some examples, when the sensor(s) 104 output sensor data, the sensor(s) may send the sensor data in one or more data packet(s) 110 to a sensor driver 112. For instance, in the case of a rotating lidar sensor, the rotating lidar sensor may continuously send/stream, to the sensor driver 112, data packet(s) 110 (e.g., UDP packets) that include lidar data captured by a partial scan of the lidar sensor. In other words, an amount of lidar data associated with a full scan of the lidar sensor may not be able to fit in a single data packet 110, so the lidar sensor may continuously send a series of data packet(s) 110 as the lidar sensor generates the lidar data. In some examples, the series of data packet(s) 110 may include delineation(s) between packets and/or scan lines of a sensor. In some examples, an amount of data included in a packet may be less than a full amount of data the packet can carry based on a delineation or may encompass data from multiple scan lines.

In some examples, the sensor driver 112 may receive data 114 from one or more components 116 of the vehicle 102. In some examples, the data 114 may include one or more of localization data generated by a localization component 118 of the vehicle, perception data generated by a perception component 120 of the vehicle 102, prediction data generated by a prediction component 122 of the vehicle 102, and/or planner data generated by a planner component 124 of the vehicle 102. In some examples, the localization data may indicate a location of the vehicle 102 in the environment 106, an orientation or pose associated with the vehicle 102, and the like. In some examples, the perception data may indicate respective locations of the objects 108 in the environment 106, classifications of the objects 108, velocities of the objects 108, sizes of the objects 108, bounding boxes associated with the objects 108, and the like. In some examples, the prediction data may indicate one or more predictions associated with the objects 108, such as predicted trajectories of the objects 108. In some examples, the planner data may include a planned trajectory 126 for the vehicle to follow in the environment 106. In various examples, the components 116 may include or otherwise utilize one or more machine-learned models or machine-learning algorithms to generate the data 114.

In some examples, based at least in part on receiving the data 114, the sensor driver 112 may determine a region of interest 128 in the environment 106. The region of interest 128 may be a portion of a full scan field of view 130 associated with the sensor(s) 104 of the vehicle 102. For instance, the region of interest 128 may be an area included within an azimuth angle associated with a rotating lidar sensor of the vehicle 102, or another rotating sensor of the vehicle 102. In some examples, the sensor driver 112 may determine the region of interest 128 based at least in part on the trajectory 126 of the vehicle 102, the presence of the object 108(3) in front of the vehicle 102, a prediction associated with the object 108(3) (or the other objects 108), based on an available roadway that the vehicle 102 is able to use, or the like.

Based at least in part on determining the region of interest 128, the sensor driver 112 may output a portion of the data packet(s) 110 to be processed. In examples, the portion of the data packet(s) 110 may include sensor data associated with the region of interest 128 within the full scan field of view 130. That is, instead of waiting to receive the sensor data packet(s) 110 for the complete scan of the entire full scan field of view 130 by the sensor(s) 104, the sensor driver 112 may determine that it has received the portion of the data packet(s) 110 associated with the region of interest 128 and cause those packet(s) 110 to be processed immediately.

In some examples, the sensor driver 112 may output or send the portion of the data packet(s) 110 to a sensor data processor 132, which may process the sensor data and generate or otherwise output processed sensor data 134. The processed sensor data 134 may then be provided to the components 116. For instance, the perception component 120 may utilize the processed sensor data 134 to update detections of the objects 108 in the environment 106. In some examples, rather than forwarding the portion of the data packet(s) 110 to the sensor data processor 132, the sensor driver 112 may provide the portion of the data packet(s) 110 directly to one or more of the components 116. In some examples, the components 116 may utilize the processed sensor data 134 (or the portion of the data packet(s) 110 to determine one or more driving instruction(s) 136 for controlling operation of the vehicle 102.

Figure 2A:
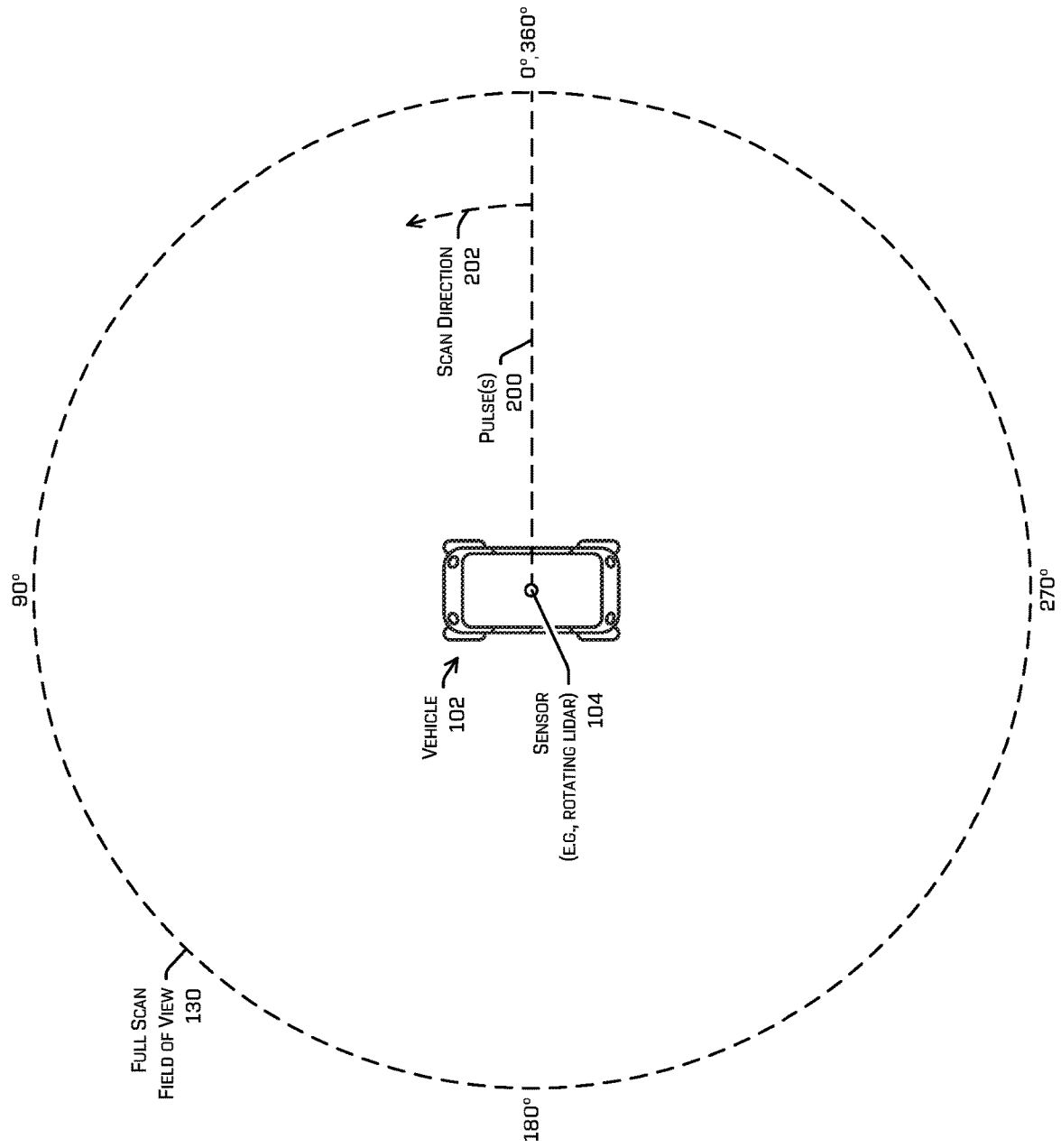
FIG. 2A illustrates an example field of view and operation of a sensor of a vehicle.

FIG. 2A illustrates an example full scan field of view 130 and operation of a sensor 104 of the vehicle 102. The vehicle 102 illustrated in FIGS. 2A-3B is from a top-down perspective. The example sensor 104 illustrated in FIG. 2A is located on the top of the vehicle 102 in a central location for ease of illustration. The sensor 104 may be a rotating lidar sensor, in some examples.

In some examples, the sensor 104 may generate sensor data by emitting one or multiple pulse(s) 200 outward from the vehicle 102. For instance, the sensor 104 may include one or more emitter(s) arranged in a line (e.g., vertical plane), and the emitter(s) may be rotated in the scan direction 202 shown and, during rotation, the emitter(s) may emit the pulse(s) 200 at set angles of rotation (e.g., every ½ degree, every degree, ever 2-degrees, etc.) and/or set frequencies (e.g., every millisecond, etc.). In some examples, the sensor 104 may continuously scan (e.g., emit the pulse(s) 200) in the counter-clockwise scan direction 202 to generate sensor data. Although the scan direction is illustrated as counter-clockwise, it should be understood that the scan direction can be clock-wise as well. In some examples, capturing sensor data associated with the full scan field of view 130 may take upwards of 100 milliseconds or more, as well as several hundred pulse(s) 200 by each one of the one or more emitter(s) of the sensor 104, in some cases.

In some examples, based at least in part on identifying a region of interest, a pulse frequency associated with the pulse(s) 200 of the sensor 104 may be increased or decreased. For instance, within a field of view that corresponds to a region of interest 128, the emitters of the sensor 104 may pulse once for every degree of rotation, half-degree of rotation, or the like. Additionally, while not within a field of view that corresponds to a region of interest, the emitters of the sensor 104 may pulse once for every two-degrees of rotation, three-degrees of rotation, or the like.

Figure 2B:
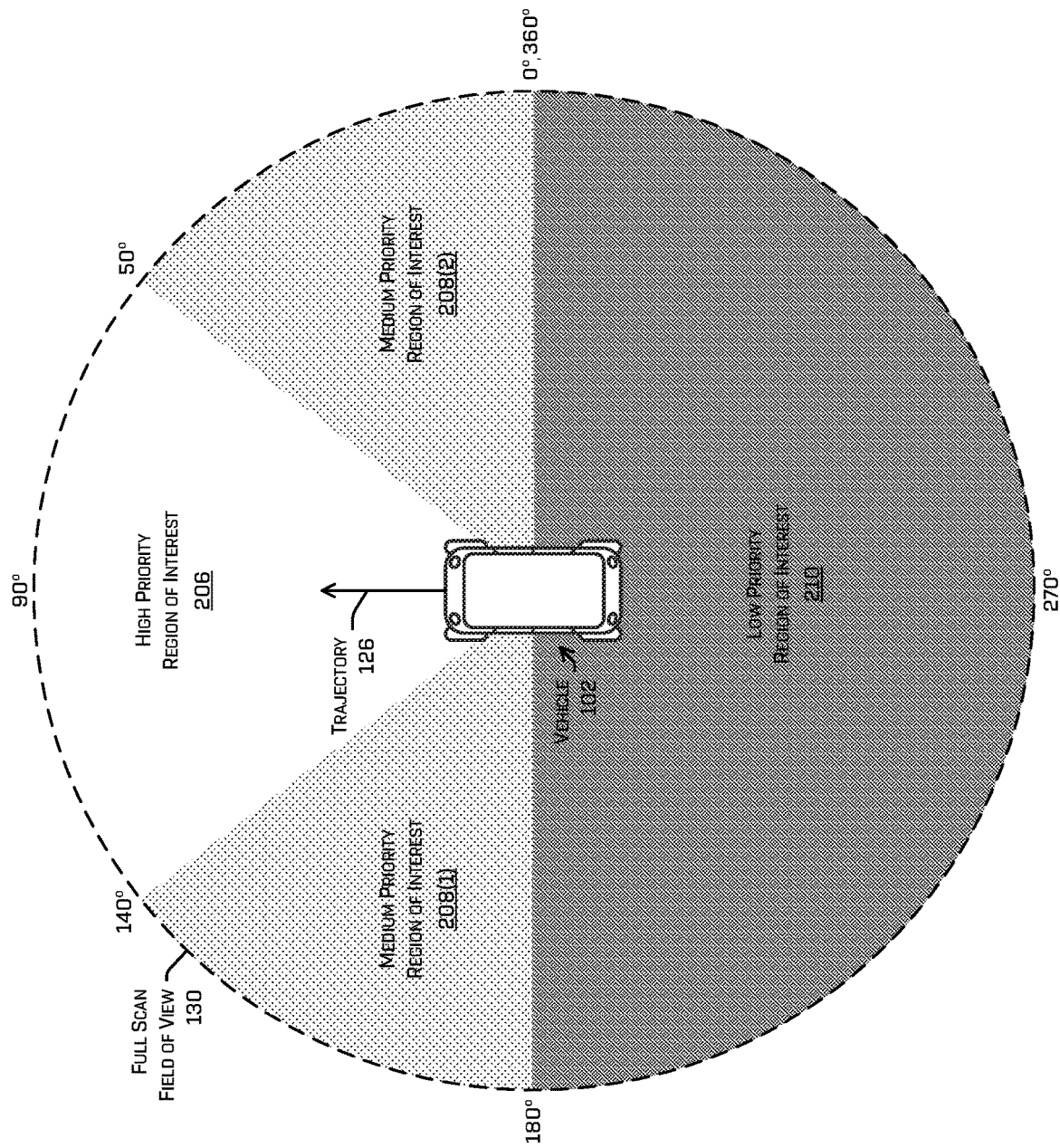
FIG. 2B illustrates example regions of interest within a field of view associated with a sensor of a vehicle. The regions of interest are prioritized based at least in part on a trajectory of the vehicle.

FIG. 2B illustrates example regions of interest within a full scan field of view 130 associated with a sensor of a vehicle 102. The regions of interest are prioritized based at least in part on the trajectory 126 of the vehicle 102. For instance, a high priority region of interest 206 is determined directly in front of the vehicle 102 (between 50-degrees and 140-degrees of the full scan field of view 130) based at least in part on the trajectory 126 of the vehicle 102 being in the 90-degree direction. Additionally, medium priority regions of interest 208(1) and 208(2) are determined between 0-degrees and 50-degrees of the full scan field of view: 130, as well as 140-degrees and 180-degrees of the full scan field of view 130. For instance, the medium priority regions of interest 208(1) and 208(2) may be determined because they are forward of the vehicle 102, but not directly in line with the trajectory 126 of the vehicle 102. Finally, a low priority region of interest 210 is determined behind the vehicle between 180-degrees and 360-degrees based at least in part on the trajectory 126.

In some examples, the different regions of interest may be treated differently for processing in accordance with the technologies disclosed herein. For instance, sensor data associated with the high priority region of interest 206 may be processed for every scan cycle, sensor data for the medium priority regions of interest 208(1) and 208(2) may be processed for every other scan cycle immediately, at the end of a full scan, or the like, and sensor data for the low priority region of interest 210 may not be processed at all, may be processed for every third scan cycle, may be processed for every other scan cycle at the end of a full scan, or the like.

Figure 2C:
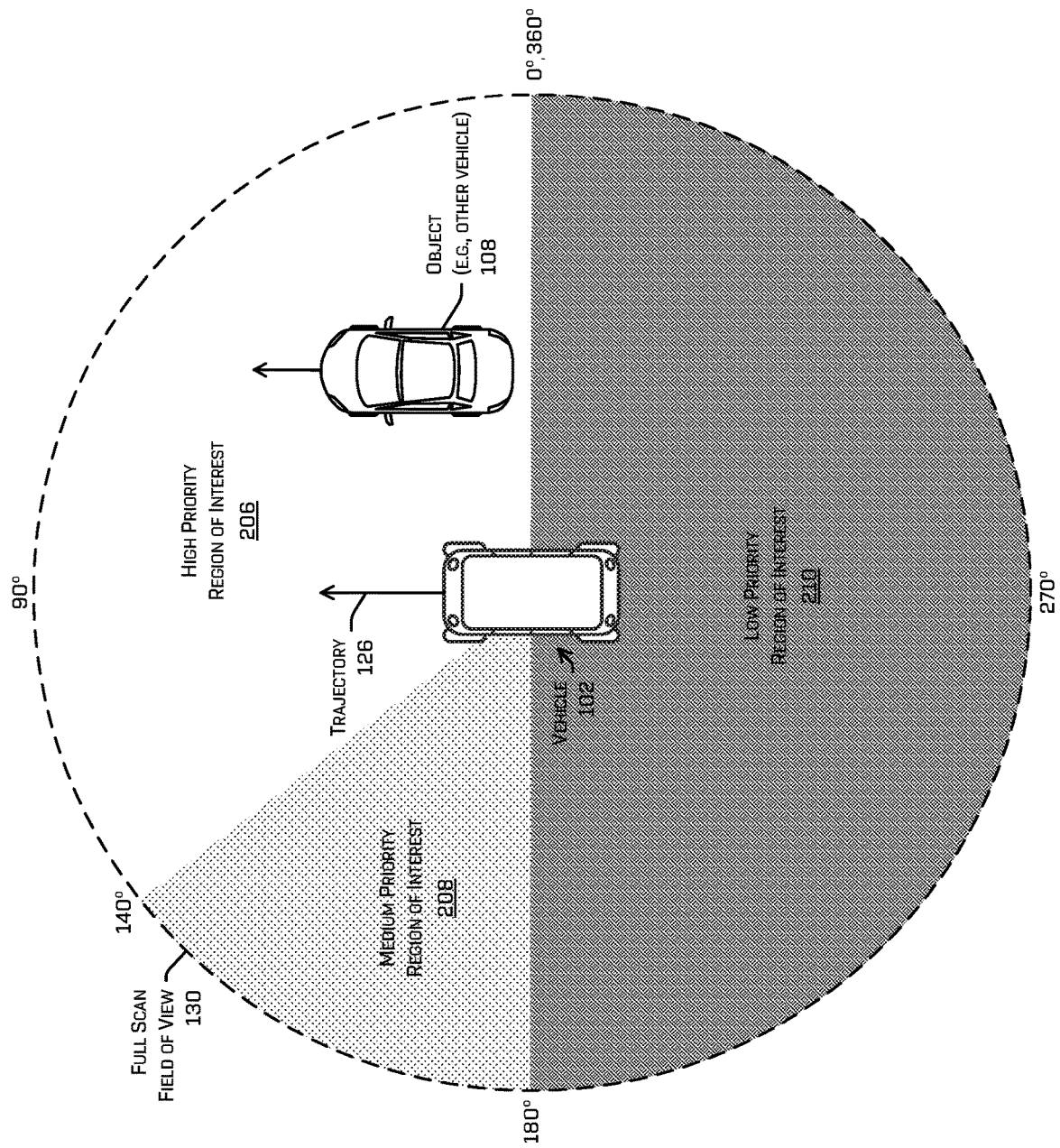
FIG. 2C illustrates another example of regions of interest within the field of view associated with the sensor of the vehicle. The regions of interest are prioritized based at least in part on the trajectory of the vehicle and the presence of an object proximate the vehicle.

FIG. 2C illustrates another example of regions of interest within the full scan field of view: 130 associated with the sensor of the vehicle 102. The regions of interest are prioritized based at least in part on the trajectory 126 of the vehicle 102 and the presence of an object 108 proximate the vehicle 102. For instance, the high priority region of interest 206 is determined directly in front and to the right of the vehicle 102 (between 0-degrees and 140-degrees of the full scan field of view: 130) based at least in part on the trajectory 126 of the vehicle 102 being in the 90-degree direction and on the object 108 being proximate the right side of the vehicle 102. Additionally, the medium priority region of interest 208 is determined between 140-degrees and 180-degrees of the full scan field of view 130. For instance, the medium priority region of interest 208 may be determined because it is forward of the vehicle 102, but not directly in line with the trajectory 126 of the vehicle 102. Finally, the low priority region of interest 210 is determined behind the vehicle between 180-degrees and 360-degrees based at least in part on the trajectory 126.

In some examples, the different regions of interest may be treated differently for processing in accordance with the technologies disclosed herein. For instance, sensor data associated with the high priority region of interest 206 may be processed for every scan cycle. sensor data for the medium priority region of interest 208 may be processed for every other scan cycle immediately, at the end of a full scan, or the like, and sensor data for the low priority region of interest 210 may not be processed at all, may be processed for every third scan cycle, may be processed for every other scan cycle at the end of a full scan, or the like.

Figure 2D:
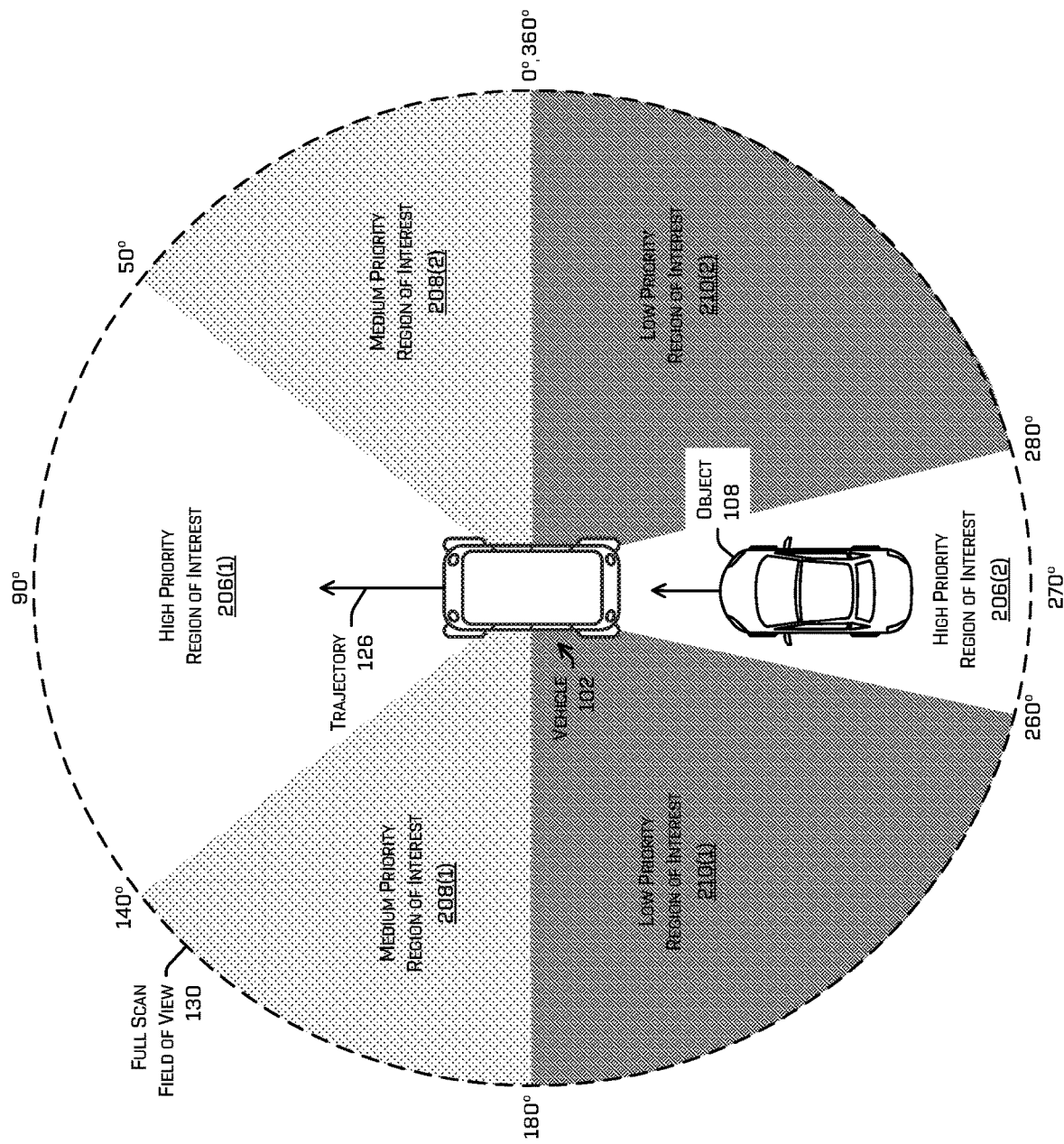
FIG. 2D illustrates yet another example of various regions of interest within the field of view associated with the sensor of the vehicle. The regions of interest are prioritized based at least in part on the trajectory of the vehicle and the presence of the object proximate the vehicle.

FIG. 2D illustrates yet another example of various regions of interest within the full scan field of view 130 associated with the sensor of the vehicle 102. The regions of interest are prioritized based at least in part on the trajectory 126 of the vehicle and the presence of the object 108 proximate the vehicle. For instance, a high priority region of interest 206(1) is determined directly in front of the vehicle 102 (between 50-degrees and 140-degrees of the full scan field of view: 130) based at least in part on the trajectory 126 of the vehicle 102 being in the 90-degree direction. Additionally, another high priority region of interest 206(2) is determined directly behind the vehicle 102 (between 260-degrees and 280-degrees) based at least in part on the presence of the object 108 behind the vehicle 102. Additionally, medium priority regions of interest 208(1) and 208(2) are determined between 0-degrees and 50-degrees of the full scan field of view 130, as well as 140-degrees and 180-degrees of the full scan field of view: 130. For instance, the medium priority regions of interest 208(1) and 208(2) may be determined because they are forward of the vehicle 102, but not directly in line with the trajectory 126 of the vehicle 102. Finally, low priority regions of interest 210(1) and 210(2) are determined behind the vehicle between 180-degrees and 260-degrees and 280-degrees and 360-degrees based at least in part on the trajectory 126.

In some examples, the different regions of interest may be treated differently for processing in accordance with the technologies disclosed herein. For instance, sensor data associated with the high priority regions of interest 206 may be processed for every scan cycle, sensor data for the medium priority regions of interest 208 may be processed for every other scan cycle immediately, at the end of a full scan, or the like, and sensor data for the low priority regions of interest 210 may not be processed at all, may be processed for every third scan cycle, may be processed for every other scan cycle at the end of a full scan, or the like.

Figure 3A:
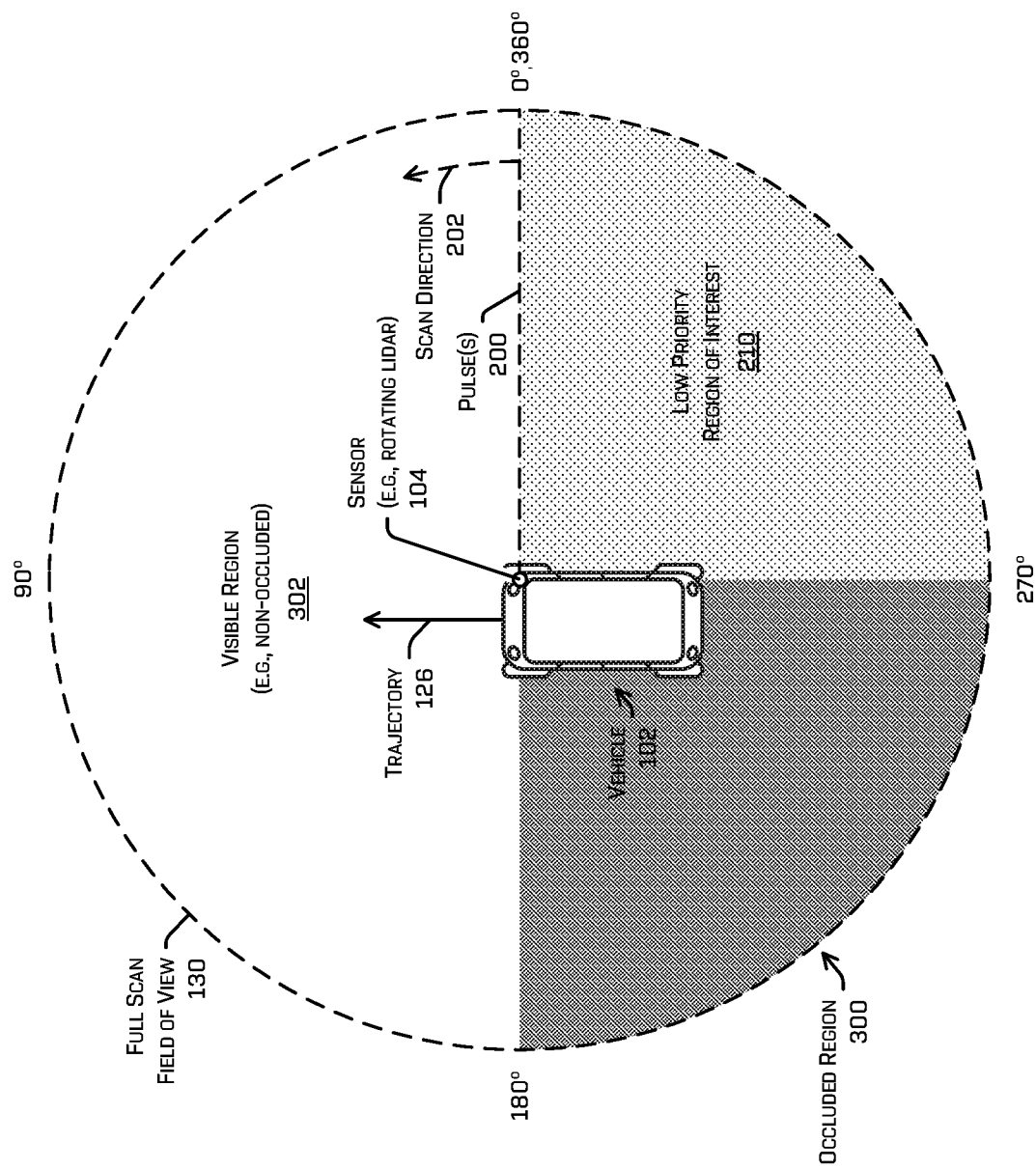
FIG. 3A illustrates an example in which different regions within a field of view of a sensor can be prioritized based at least in part on a trajectory of the vehicle.

FIG. 3A illustrates an example in which different regions within a full scan field of view 130 of a sensor can be prioritized based on a trajectory 126 of the vehicle. In FIG. 3A, the sensor 104 is positioned on top of the right forward corner of the vehicle 102. As such, an occluded region exists between 180-degrees and 270-degrees of the sensor 104 due to the body of the vehicle 102 occluding the full scan field of view 130.

In such examples, the occluded region 300 may be assigned a low priority such that sensor data associated with the occluded region 300 is not processed or processed less frequency or with higher latency. The visible region 302 may be associated with a high priority as the region is visible (e.g., not occluded) and the region is forward of the trajectory 126 of the vehicle 102. The region between 270-degrees and 360-degrees may be determined as a low priority region of interest 210 based at least in part on the trajectory 126 of the vehicle 102 being in the 90-degree direction.

The occluded region 300 and low priority region of interest 210 in FIG. 3A help illustrate the importance of the technologies disclosed herein. For instance, without using the techniques of this disclosure, if the sensor 104 were to start scanning (e.g., emitting pulse(s) 200) in the scan direction 202 at $T_0$, the sensor 104 will have scanned to 180-degrees in roughly 50 milliseconds time. However, the sensor 104 would need to continue scanning from 180-degrees to 360-degrees (another roughly 50 milliseconds) to generate sensor data associated with those regions, and then send that sensor data off for processing. However, at least roughly 50 milliseconds have passed since the sensor 104 finished the scan at 180-degrees, and even more time in other regions. As such, the sensor data associated with the high priority, visible region 302 will be at least 50-100 milliseconds stale by the time it is processed after waiting for a completion of a full scan, even though this region is more important than the others. Additionally, processing all of the sensor data (even the sensor data associated with the occluded region 300) in such a situation does not effectively utilize the processor(s), and essentially processing power would be wasted processing the sensor data associated with the occlude region 300 and/or the low priority region of interest 210.

Figure 3B:
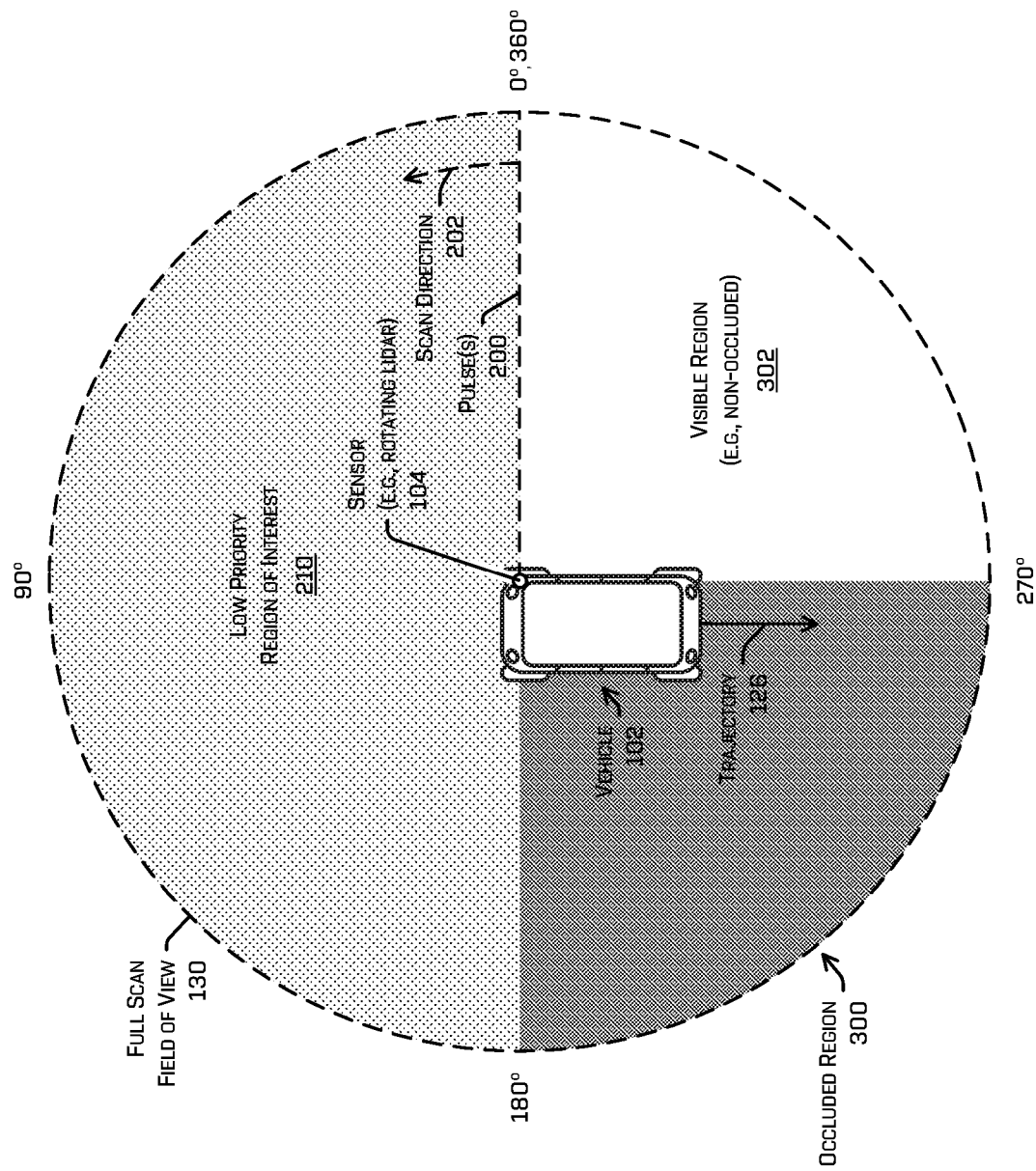
FIG. 3B illustrates an example in which the priority of different regions within the field of view of the sensor can be updated based on a change in the trajectory of the vehicle.

FIG. 3B illustrates an example in which the priority of different regions within the full scan field of view 130 of the sensor 104 can be updated based on a change in the trajectory 126 of the vehicle 102. In FIG. 3B, the occluded region 300 still exists between 180-degrees and 270-degrees of the sensor 104 due to the body of the vehicle 102 occluding the full scan field of view 130.

In such examples, the occluded region 300 may be assigned a low priority such that sensor data associated with the occluded region 300 is not processed or processed at a lower priority (e.g., a lower frequency or higher latency), even though the occluded region is in the direction of the trajectory 126. The visible region 302 may be associated with a high priority as the region is visible (e.g., not occluded) and the region is forward of the trajectory 126 of the vehicle 102. The region between 0-degrees and 180-degrees may be determined as a low priority region of interest 210 based at least in part on the trajectory 126 of the vehicle 102 being in the 270-degree direction.

The occluded region 300 and low priority region of interest 210 in FIG. 3A further help illustrate the importance of the technologies disclosed herein. For instance, without using the techniques of this disclosure, sensor data associated with a scan from 0-degrees to 360-degrees would all be sent for processing and processed accordingly. However, by marking the regions between 0-degrees and 270-degrees as low priority and refraining from processing the sensor data associated with those regions at given cycles, a maximum of 75% processing power can be reserved at any given time and a minimum of 25% processing power can be preserved by refraining from processing sensor data associated with the occluded region 300.

Figure 4:
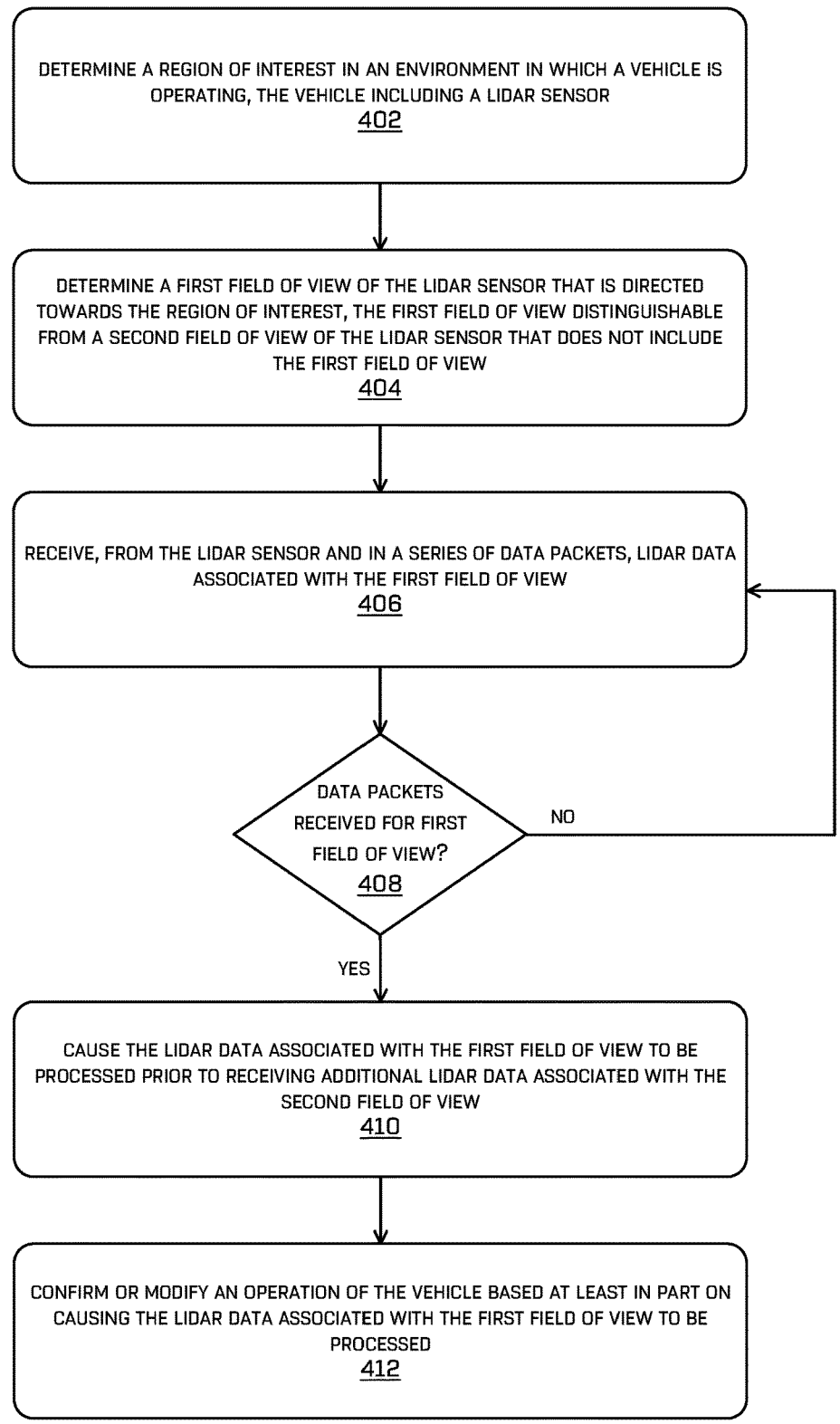
FIG. 4 is a flowchart illustrating an example process associated with the technologies disclosed herein for partial sensor data processing for latency reduction.
Figure 5:
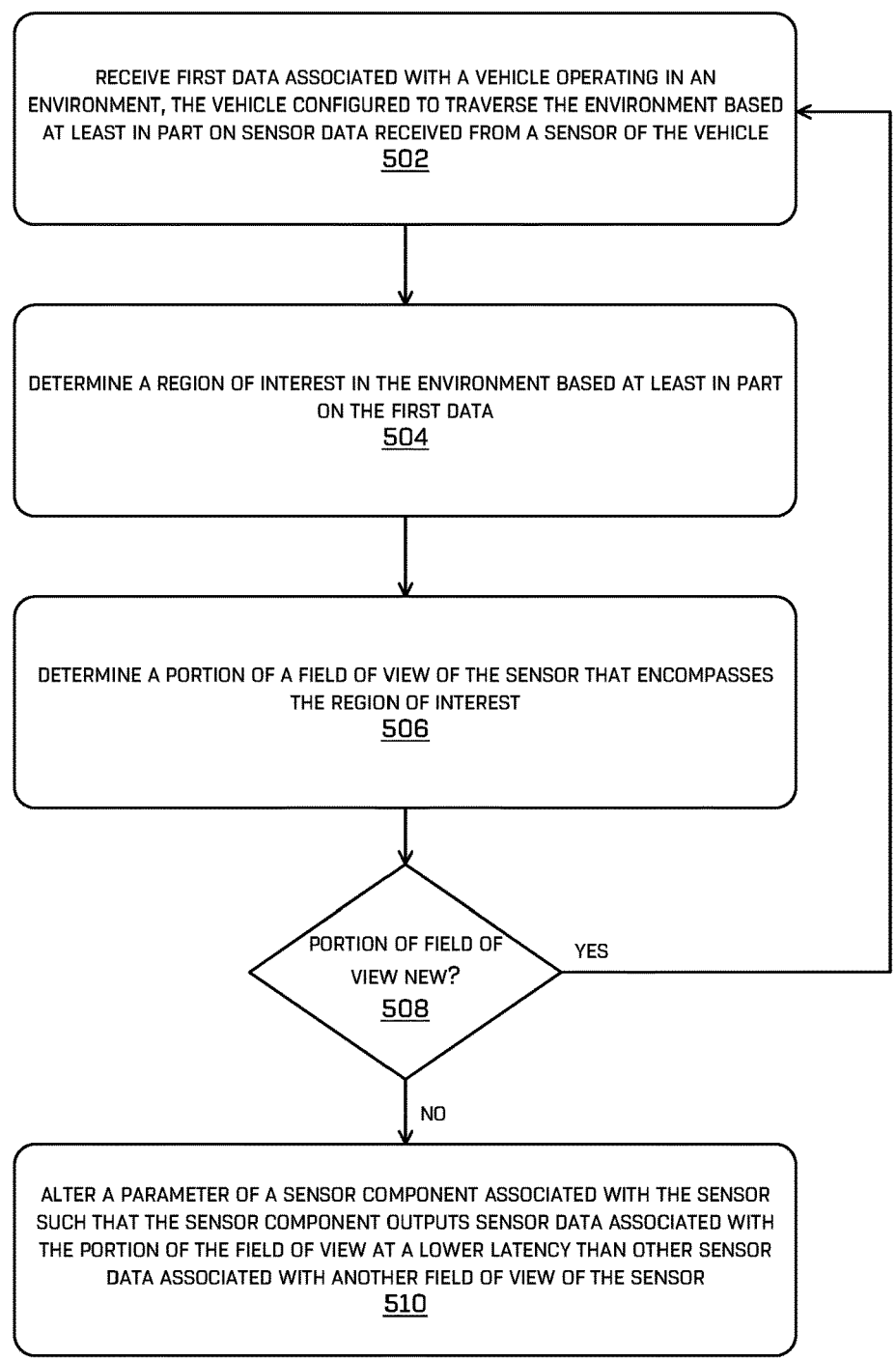
FIG. 5 is a flowchart illustrating an example process associated with the technologies disclosed herein for directed sensor data processing.

FIGS. 4 and 5 are flowcharts illustrating example processes 400 and 500 according to the various technologies disclosed herein. By way of example, the processes 400 and 500 are illustrated as logical flow graphs, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types.

In the processes 400 and 500, the order in which the operations are described is not intended to be construed as a limitation, and any number of the described operations can be combined (or omitted) in any order and/or in parallel to implement the processes 400 and 500. In some examples, multiple branches represent alternate implementations that may be used separately or in combination with other operations discussed herein. The processes 400 and 500 illustrated may be described with reference to components and elements described above with reference to FIGS. 1-3B for convenience and ease of understanding. However, the processes 400 and 500 are not limited to being performed using these components, and the components are not limited to performing the processes 400 and 500.

FIG. 4 is a flowchart illustrating an example process 400 associated with the technologies disclosed herein for partial sensor data processing for latency reduction. The process 400 begins at operation 402, which includes determining a region of interest in an environment in which a vehicle is operating, the vehicle including a lidar sensor. For instance, the sensor driver 112 may determine the region of interest 128 in the environment 106 in which the vehicle 102 is operating. In some examples, the region of interest may be determined based at least in part on one or more of a planned trajectory of the vehicle, a location of an object (e.g., another vehicle, a pedestrian, a cyclist, etc.) detected in the environment, a prediction associated with the object, a geolocation and/or pose of the vehicle, an event detected in the environment (e.g., an accident, emergency lights, construction zone, etc.), an occlusion associated with a sensor of the vehicle, and/or the like. In some examples, the region of interest may be determined based at least in part on one or more of perception data received from a perception component of the vehicle, planning data received from a planner component of the vehicle, localization data received from a localization component of the vehicle, and/or prediction data received from a prediction component of the vehicle.

At operation 404, the process 400 includes determining a first field of view of the lidar sensor that is directed towards the region of interest, the first field of view distinguishable from a second field of view of the lidar sensor that does not include the first field of view. For instance, the sensor driver 112 may determine the first field of view of the lidar sensor that is directed towards the region of interest 128. In some examples, the first field of view may be less than a complete field of view associated with the sensor. For instance, a complete field of view of the sensor may include, in some examples, a combination of the first field of view, the second field of view, and one or more additional fields of view. In some instances, such as in the case of rotating sensors (e.g., rotating lidar sensor, rolling shutter camera, radar, etc.), determining the first field of view may comprise determining an azimuth angle associated with a partial scan of the rotating sensor that encompasses the region of interest.

At operation 406, the process 400 includes receiving, from the lidar sensor and in a series of data packets, lidar data associated with the first field of view. For instance, the sensor driver 112 may receive, from the sensor(s) 104 in a series of data packet(s) 110, lidar data associated with the first field of view. In some examples, the series of data packet(s) may be a series of UDP packets, TCP packets, IP packets, or the like. That is, when sensor data is received for a scan of a sensor, the sensor data associated with a full scan of the sensor may be partitioned into different packets of the series of data packets. For instance, a first data packet may include first sensor data associated with a first field of view of the sensor (e.g., a first azimuth angle of a rotating sensor), a second data packet may include sensor data associated with a second field of view of the sensor (e.g., a second azimuth angle of the rotating sensor), and so forth.

At operation 408, the process 400 includes determining whether all of the data packet(s) including the lidar data associated with the first field of view have been received. For instance, the sensor driver 112 may determine whether all of the data packet(s) 110 associated with the field of view that includes the region if interest 128 have been received.

If, at operation 408, it is determined that all of the data packet(s)/lidar data associated with the first field of view/region of interest have been received, the process 400 proceeds to operation 410. However, if it is determined that all of the data packet(s)/lidar data associated with the first field of view/region of interest have not been received, the process 400 may return to operation 406. That is, if the sensor driver 112 has not received all the data packet(s)/lidar data associated with the first field of view/region of interest, then the sensor driver 112 may wait until all the data packet(s)/lidar data has been received.

At operation 410, the process 400 includes causing the lidar data associated with the first field of view to be processed prior to receiving additional lidar data associated with the second field of view. For instance, the sensor driver 112 may forward the portion of the data packet(s) 110 including the lidar data associated with the first field of view/region of interest 128 to the sensor data processor 132 and/or the components 116 to be processed prior to receiving additional data packet(s) 110. In some examples, causing sensor data associated with the first field of view to be processed may be performed partially in response to determining that all the data packet(s) associated with the first field of view/region of interest have been received.

At operation 412, the process 400 includes confirming or modifying an operation of the vehicle based at least in part on causing the lidar data associated with the first field of view to be processed. For instance, the planner component 124 of the vehicle 102 may confirm or modify an operation of the vehicle 102 based at least in part on the sensor driver 112 causing the lidar data associated with the first field of view/region of interest 128 to be processed. In some instances, causing the lidar data associated with the first field of view/region of interest to be processed prior to receiving the additional lidar data may reduce a latency associated with confirming or modifying of the operation of the vehicle. That is, the operation of the vehicle may be either confirmed or modified in less time than if the sensor data was to be processed only after a complete scan was made by the sensor.

FIG. 5 is a flowchart illustrating an example process 500 associated with the technologies disclosed herein for directed sensor data processing. The process 500 begins at operation 502, which includes receiving first data associated with a vehicle operating in an environment, the vehicle configured to traverse the environment based at least in part on sensor data received from a sensor of the vehicle. For instance, the sensor driver 112 may receive the first data 114 associated with the vehicle 102 operating in the environment 106. In some examples, the first data may be perception data, localization data, planner data, prediction data, or the like.

At operation 504, the process 500 includes determining a region of interest in the environment based at least in part on the first data. For instance, the sensor driver 112 may determine the region of interest 128 in the environment 106 based at least in part on the first data 114. In some examples, the first data may be perception data and the region of interest may be determined based at least in part on the perception data indicating a presence of an object within the region of interest. Additionally, or alternatively, the first data may be localization data indicating a location and pose of the vehicle in the environment, and the region of interest may be determined based at least in part on the location and pose of the vehicle. Additionally, or alternatively, the first data may be planner data indicating a planned trajectory of the vehicle, and the region of interest may be determined based at least in part on the planned trajectory.

At operation 506, the process 500 includes determining a portion of a field of view of the sensor that encompasses the region of interest. For instance, the sensor driver 112 May determine the portion of the full scan field of view 130 of the sensor 104 that encompasses the region of interest 128. In some examples, the sensor may be a rotating sensor (e.g., rotating lidar sensor, rolling shutter image sensor, spinning radar, etc.) and determining the portion of the field of view that encompasses the region of interest may comprise determining an azimuth angle associated with a partial scan of the rotating sensor that encompasses the region of interest.

At operation 508, the process 500 includes determining whether the portion of the field of view is different from a previously identified portion. That is, for instance, the sensor driver 112 may determine whether it has already identified the portion of the full scan field of view: 130 associated with the region of interest 128 as a particular region of interest. If so, then the process 500 proceeds to operation 502. If not, then the process 500 proceeds to operation 510.

At operation 510, the process 500 includes alter a parameter of a sensor component associated with the sensor such that the sensor component outputs sensor data associated with the portion of the field of view at a lower latency than other sensor data associated with another field of view of the sensor. For instance, the parameter of the sensor driver 112 may be altered such that the sensor driver 112 outputs sensor data associated with the portion of the full scan field of view: 130/region of interest 128 at the lower latency. Additionally, or alternatively, altering the parameter of the sensor component may cause the sensor component to refrain from outputting the other sensor data for one or more consecutive scans of the sensor. Additionally, or alternatively, altering the parameter of the sensor component may cause the sensor component to output the sensor data associated with the portion of the field of view/region of interest at a higher frequency than other portions of the field of view.

In some examples, a priority associated with the region of interest may be determined, and outputting the sensor data at the lower latency than the other sensor data may be based at least in part on the priority associated with the region of interest being greater than another priority associated with another region of interest within the field of view of the sensor. In some instances, the priority associated with the region of interest may be determined based at least in part on one or more of a distance between the vehicle and the region of interest, a size of the region of interest, a planned trajectory of the vehicle, a presence of an object in the region of interest, and/or the like.

Figure 6:
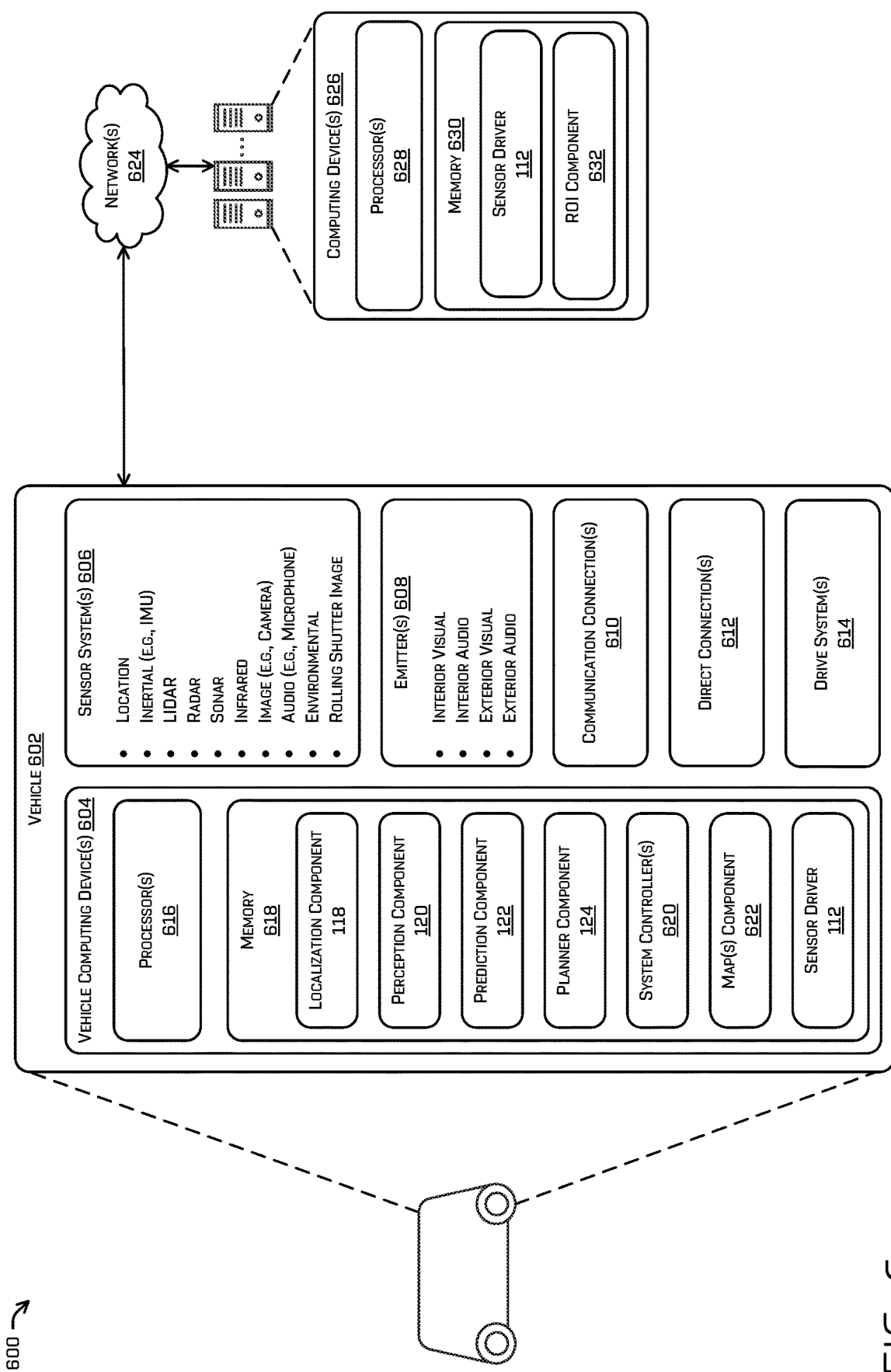
FIG. 6 is a block diagram illustrating an example system that may be used for performing the techniques described herein.

FIG. 6 is a block diagram illustrating an example system 600 that may be used for performing the techniques described herein. In at least one example, a vehicle 602, which can correspond to the vehicle 102 described above with reference to FIGS. 1-5, can include one or more vehicle computing device(s) 604, one or more sensor system(s) 606, one or more emitter(s) 608, one or more communication connection(s) 610, one or more direct connection(s) 612, and one or more drive system(s) 614.

In at least one example, a vehicle 602 can be an autonomous vehicle configured to operate according to a classification issued by the U.S. National Highway Traffic Safety Administration, which describes a vehicle capable of performing all safety-critical functions without the driver (or occupant) being expected to control the vehicle at any time. In such an example, since the vehicle 602 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 602 is an autonomous vehicle: however, the vehicle 602 could be any other type of vehicle. While only a single vehicle 602 is illustrated in FIG. 6, in a practical application, the example system 600 can include a plurality of vehicles, which, in some examples, can comprise a fleet of vehicles.

The vehicle computing device(s) 604 can include processor(s) 616 and memory 618 communicatively coupled with the processor(s) 616. In the illustrated example, the memory 618 of the vehicle computing device(s) 604 stores the localization component 118, the perception component 120, the prediction component 122, the planner component 124, one or more system controller(s) 620, a map(s) component 622, and the sensor driver 112.

In at least one example and as described above, the localization component 118 can determine a pose (position and orientation) of the vehicle 602 in relation to a local and/or global map based at least in part on sensor data received from the sensor system(s) 606 and/or map data associated with a map of an environment in which the vehicle 602 is operating (e.g., provided by the map(s) component 622). In at least one example, the localization component 118 can include, or be associated with, a calibration component that is capable of performing operations for calibrating (determining various intrinsic and extrinsic parameters associated with any one or more of the sensor system(s) 606), localizing, and mapping substantially simultaneously. In at least one example, the localization component 118 may provide localization data to the sensor driver 112 and/or the region of interest (ROI) component 632, and the sensor driver 112 or the ROI component 632 may use the localization data determine a portion of field of view associated with a sensor that includes a region of interest in the environment.

In at least one example, the perception component 120 can perform object detection, segmentation, and/or classification based at least in part on sensor data received from the sensor system(s) 606. In at least one example, the perception component 120 can receive raw sensor data from the sensor system(s) 606 and/or the sensor driver 112. In at least one example, the perception component 120 can receive sensor data and can utilize one or more processing algorithms and/or machine-learned models to perform object detection, segmentation, and/or classification with respect to object(s) identified in the sensor data. In some examples, the perception component 120 can associate a bounding region (e.g., bounding box or otherwise an instance segmentation) with an identified object and can associate a confidence score associated with a classification of the identified object with the identified object. In at least one example, the perception component 120 can provide perception data to the sensor driver 112 and/or the region of interest (ROI) component 632, and the sensor driver 112 or the ROI component 632 may use the perception data to determine a portion of field of view associated with a sensor that includes a region of interest in the environment.

The prediction component 122 can receive sensor data from the sensor system(s) 606, map data, and/or perception data output from the perception component 120 (e.g., processed sensor data), as well as outputs from the sensor driver 112, and can output predictions associated with one or more objects within the environment of the vehicle 602. Predictions can include predicted trajectories associated with objects in the environment in which the vehicle 602 is operating. In at least one example, the prediction component 122 can provide prediction data to the sensor driver 112 and/or the region of interest (ROI) component 632, and the sensor driver 112 or the ROI component 632 may use the prediction data to determine a portion of field of view associated with a sensor that includes a region of interest in the environment.

The planner component 124 may receive data, information, and/or outputs from the localization component 118, the perception component 120, the prediction component 122, the map(s) component 622, and/or the sensor driver 112 and may generate one or more proposed vehicle operations (e.g., proposed trajectories). Additional details of localization components, perception components, prediction components, and/or planner components that are usable can be found in U.S. Pat. No. 9,612,123, issued on Apr. 4, 2017, and U.S. Pat. No. 10,363,390, issued on Jul. 16, 2019, the entire contents of both of which are incorporated by reference herein in their entirety and for all purposes. In at least one example, the planner component 124 can provide planner data to the sensor driver 112 and/or the region of interest (ROI) component 632, and the sensor driver 112 or the ROI component 632 may use the planner data to determine a portion of field of view associated with a sensor that includes a region of interest in the environment. In some examples (e.g., where the vehicle 602 is not an autonomous vehicle), one or more of the aforementioned components can be omitted from the vehicle 602.

In at least one example, the vehicle computing device(s) 604 can include one or more system controller(s) 620, which can be configured to control steering, propulsion, braking, safety, emitters, communication, and other systems of the vehicle 602. These system controller(s) 620 can communicate with and/or control corresponding systems of the drive system(s) 614 and/or other systems of the vehicle 602.

The map(s) component 622 may store one or more map(s) associated with an environment in which the vehicle 602 operates. In some examples, the map(s) component 622 may include functionality to generate new maps representing an environment in real-time as the vehicle 602 operates, update maps associated with the environment, or the like. In at least one example, the map(s) component 622 can provide map data to the sensor driver 112 and/or the region of interest (ROI) component 632, and the sensor driver 112 or the ROI component 632 may use the map data to determine a portion of field of view associated with a sensor that includes a region of interest in the environment.

While the components described above are illustrated as "onboard" the vehicle 602, in other implementations, the components can be remotely located and/or accessible to the vehicle 602. For instance, some or all of the components can be remotely located on the computing device(s) 626 and accessible to the vehicle 602 via one or more network(s) 624. Furthermore, while the components are described above as "components," such components can comprise one or more components and/or modules, which can be part of a system, for performing operations attributed to each of the components.

In at least one example, the localization component 118, the perception component 120, the prediction component 122, the planner component 124, the map(s) component 622, and/or the sensor driver 112 can process data, as described above, and can send their respective outputs over the network(s) 624, to computing device(s) 626. In at least one example, the localization component 118, the perception component 120, the prediction component 122, the planner component 124, the map(s) component 622, and/or the sensor driver 112 can send their respective outputs to the computing device(s) 626 at a particular frequency, after a lapse of a predetermined period of time, in near real-time, etc.

In at least one example, the sensor system(s) 606 can include lidar sensors (e.g., rotating lidar sensors, flash lidar sensors), radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, rolling shutter image sensors, etc. The sensor system(s) 606 can provide input to the vehicle computing device(s) 604. In some examples, the sensor system(s) 606 can preprocess at least some of the sensor data prior to sending the sensor data to the vehicle computing device(s) 604. In at least one example, the sensor system(s) 606 can send sensor data, via the network(s) 624, to the computing device(s) 626 at a particular frequency, after a lapse of a predetermined period of time, in near real-time, etc.

The vehicle 602 can also include one or more emitters 608 for emitting light and/or sound, as described above. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 608 can be positioned at various locations about the exterior and/or interior of the vehicle 602.

The vehicle 602 can also include communication connection(s) 610 that enable communication between the vehicle 602 and other local or remote computing device(s), such as the computing device(s) 626, as well as other remote or local computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device(s) 604 to another computing device or a network, such as network(s) 624. For example, the communications connection(s) 610 can enable Wi-Fi-based communication such as via frequencies defined by the IEEE 602.11 standards, short range wireless frequencies such as BLUETOOTH®, or any suitable wired or wireless communications protocol that enables the respective computing device to interface with the other computing device(s).

The direct connection(s) 612 can directly connect the drive system(s) 614 and other systems of the vehicle 602. In at least one example, the vehicle 602 can include drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include sensor component(s) to detect conditions of the drive system(s) 614 and/or the surroundings of the vehicle 602. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 614. In some cases, the sensor component(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle 602, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 614. Furthermore, the drive system(s) 614 also include communication connection(s) that enable communication by the respective drive system with other local or remote computing device(s).

In FIG. 6, the vehicle computing device(s) 604, sensor system(s) 606, emitter(s) 608, and the communication connection(s) 610 are shown onboard the vehicle 602. However, in some examples, the vehicle computing device(s) 604, sensor system(s) 606, emitter(s) 608, and the communication connection(s) 610 can be implemented outside of an actual vehicle (i.e., not onboard the vehicle 602).

As described above, the vehicle 602 can send data to the computing device(s) 626, via the network(s) 624. In some examples, the vehicle 602 can send raw sensor data to the computing device(s) 626. In other examples, the vehicle 602 can send processed sensor data and/or representations of sensor data to the computing device(s) 626 (e.g., data output from the localization component 118, the perception component 120, the prediction component 122, the planner component 124, the machine-learned models, etc.). In some examples, the vehicle 602 can send data to the computing device(s) 626 at a particular frequency, after a lapse of a predetermined period of time, in near real-time, etc.

The computing device(s) 626 can receive the data (raw or processed) from the vehicle 602 and/or other data collection devices, as well as data from one or more third party sources and/or systems. In at least one example, the computing device(s) 626 can include processor(s) 628 and memory 630 communicatively coupled with the processor(s) 628. In the illustrated example, the memory 630 of the computing device(s) 626 stores the sensor driver 112 and the ROI component. In some examples, one or more of the systems and/or components can be associated with the vehicle 602 or other computing device(s) associated with the system 600 instead of, or in addition to, being associated with the memory 630 of the computing device(s) 626.

The ROI component 632 may include functionality for determining a regions of interest in an environment in which the vehicle 602 is operating. Although illustrated as a distributed, standalone component, in some examples the ROI component 632 may be a component of the sensor driver 112. That is, the ROI component 632 may determine regions of interest and provide those regions of interest to the sensor driver 112, and the sensor driver may determine sensor fields of view (e.g., azimuth angles, etc.) that correspond with those regions of interest.

The processor(s) 616 of the vehicle 602 and the processor(s) 628 of the computing device(s) 626 can be any suitable processor capable of executing instructions to process data and perform operations as described herein. By way of example and not limitation, the processor(s) 616 and 628 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 630 are examples of non-transitory computer-readable media. Memory 618 and 630 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in some examples, components of the vehicle 602 can be associated with the computing device(s) 626 and/or the components of the computing device(s) 626 can be associated with the vehicle 602. That is, the vehicle 602 can perform one or more of the functions associated with the computing device(s) 626, and vice versa.

Furthermore, while the vehicle computing device(s) 604 and the computing device(s) 626 are shown to include multiple components, in some examples, such components can be associated with more or fewer individual components. For example, the localization component 118, the perception component 120, the prediction component 122, the planner component 124, the map(s) component 622, the sensor driver 112, and/or the ROI component 632 can be combined into a single component. That is, while depicted as separate components, any one or more of the components can be combined.

Example Clauses

A. A system comprising: one or more processors; and one or more non-transitory computer-readable media storing instructions that, when executed by the one or more processors, cause the system to perform operations comprising: determining, based at least in part on a planned trajectory of a vehicle, a region of interest in an environment in which the vehicle is operating, the vehicle including a lidar sensor: determining that a first field of view of the lidar sensor is directed towards the region of interest and that a second field of view of the lidar sensor does not include the first field of view, wherein a complete field of view of the lidar sensor includes the first field of view and the second field of view: receiving, from the lidar sensor, a first portion of lidar data associated with the first field of view of the lidar sensor: causing the first portion of the lidar data to be processed prior to receiving a second portion of the lidar data associated with the second field of view, wherein the first portion of the lidar data and the second portion of the lidar data are associated with the complete field of view of the lidar sensor; and at least one of confirming or modifying an operation of the vehicle based at least in part on causing the first portion of the lidar data to be processed.

B. The system as recited in paragraph A, wherein receiving the first portion of the lidar data comprises receiving one or more User Datagram Protocol (UDP) packets including the first portion of the lidar data, the one or more UDP packets being distinguishable from one or more additional UDP packets including the second portion of the lidar data.

C. The system as recited in any one of paragraphs A-B, the operations further comprising determining a range of azimuth angles associated with the region of interest, wherein determining that the first field of view of the lidar sensor is directed towards the region of interest comprises determining that the first field of view of the lidar sensor corresponds with the range of azimuth angles.

D. The system as recited in any one of paragraphs A-C, wherein the region of interest in the environment is further determined based at least in part on at least one of a location of an object in the environment, a predicted trajectory of the object, an orientation of another sensor of the vehicle, or an event detected in the environment.

E. A method comprising: receiving sensor data captured by a sensor of a vehicle that is operating in an environment, the sensor data associated with a partial scan of the sensor, wherein the partial scan corresponds with a region of interest in the environment; and based at least in part on the sensor data corresponding with the region of interest, initiating processing of the sensor data prior to receiving additional sensor data, the partial scan being less than a complete scan by the sensor.

F. The method as recited in paragraph E, further comprising at least one of confirming or modifying an operation of the vehicle based at least in part on initiating processing of the sensor data.

G. The method as recited in any one of paragraphs E-F, wherein initiating processing of the sensor data associated with the partial scan prior to the complete scan reduces a latency associated with the at least one of the confirming or the modifying of the operation of the vehicle than if the sensor data associated with the partial scan were processed after the complete scan.

H. The method as recited in any one of paragraphs E-G, further comprising determining the region of interest in the environment based at least in part on a planned trajectory of the vehicle.

I. The method as recited in any one of paragraphs E-H, further comprising determining the region of interest in the environment based at least in part on at least one of a location of an object in the environment, a detected event in the environment, or an orientation of the sensor with respect to another sensor of the vehicle.

J. The method as recited in any one of paragraphs E-I, wherein the sensor is a rotating lidar sensor and the sensor data is lidar data.

K. The method as recited in any one of paragraphs E-J, further comprising determining a range of azimuth angles that captures lidar data corresponding with the region of interest, and wherein the partial scan corresponds with the range of azimuth angles.

L. The method as recited in any one of paragraphs E-K, wherein the sensor is a rolling shutter image sensor, the sensor data is image data, and the partial scan is associated with a portion of a frame of the image data.

M. The method as recited in any one of paragraphs E-L, wherein receiving the sensor data comprises receiving a first data packet including the sensor data, and wherein initiating processing of the sensor data prior to receiving the additional sensor data comprises causing the sensor data to be processed prior to receiving a second data packet including at least a portion of the additional sensor data.

N. The method as recited in any one of paragraphs E-M, wherein causing the sensor data to be processed comprises sending the sensor data to a perception component associated with the vehicle.

O. One or more non-transitory computer-readable media storing instructions that, when executed, cause one or more processors to perform operations comprising: receiving sensor data captured by a sensor of a vehicle that is operating in an environment, the sensor data associated with a partial scan of the sensor, wherein the partial scan corresponds with a region of interest in the environment; and based at least in part on the sensor data corresponding with the region of interest, initiating processing of the sensor data prior to receiving additional sensor data, the partial scan being less than a complete scan by the sensor.

P. The one or more non-transitory computer-readable media as recited in paragraph O, the operations further comprising determining, based at least in part on a planned trajectory of the vehicle, the region of interest in the environment.

Q. The one or more non-transitory computer-readable media as recited in any one of paragraphs O-P, the operations further comprising determining the region of interest in the environment based at least in part on at least one of a location of an object in the environment, a detected event in the environment, or an orientation of the sensor with respect to another sensor of the vehicle.

R. The one or more non-transitory computer-readable media as recited in any one of paragraphs O-Q, wherein the sensor is at least one of a rotating lidar sensor or a rolling shutter image sensor.

S. The one or more non-transitory computer-readable media as recited in any one of paragraphs O-R, wherein the sensor data is at least one of lidar data or image data.

T. The one or more non-transitory computer-readable media as recited in any one of paragraphs O-S, wherein receiving the sensor data comprises receiving a first data packet including the sensor data, and wherein initiating processing of the sensor data prior to receiving the additional sensor data comprises causing the sensor data to be processed prior to receiving a second data packet including at least a portion of the additional sensor data.

U. A system comprising: one or more processors; and one or more non-transitory computer-readable media storing instructions that, when executed by the one or more processors, cause the system to perform operations comprising: receiving, from a perception component of a vehicle that is operating in an environment, perception data associated with the environment or, from a planner component of the vehicle, planning data including a planned trajectory of the vehicle in the environment: determining a region of interest in the environment based at least in part on at least one of the perception data or the planning data, the region of interest associated with at least one of an object in the environment or the planned trajectory of the vehicle: determining a portion of a field of view of a lidar sensor of the vehicle that encompasses the region of interest; and altering a parameter of a lidar driver associated with the lidar sensor such that the lidar driver causes lidar data associated with the region of interest to be processed at a lower latency than other lidar data associated with other portions of the field of view.

V. The system as recited in paragraph U, the operations further comprising determining, based at least in part on the perception data and the planning data, an occlusion associated with the planned trajectory of the vehicle, wherein the region of interest is determined based at least in part on the occlusion associated with the planned trajectory.

W. The system as recited in any one of paragraphs U-V, wherein the lidar sensor is a rotating lidar sensor and determining the portion of the field of view comprises determining a range of azimuth angles associated with a partial scan of the rotating lidar sensor that encompasses the region of interest.

X. The system as recited in any one of paragraphs U-W, wherein the region of interest is a first region of interest, the operations further comprising: determining a second region of interest in the environment based at least in part on at least one of the perception data or the planning data; and determining to prioritize processing of the lidar data associated with the first region of interest over lidar data associated with the second region of interest based at least in part on at least one of: the vehicle being closer in distance to the first region of interest than the second region of interest: an occlusion associated with the first region of interest: or an event detected in the first region of interest.

Y. A method comprising: receiving first data associated with a vehicle operating in an environment, the vehicle configured to traverse the environment based at least in part on sensor data received from a sensor of the vehicle: determining a region of interest in the environment based at least in part on the first data: determining a portion of a field of view of the sensor that encompasses the region of interest; and altering a parameter of a sensor component associated with the sensor such that the sensor component outputs sensor data associated with the portion of the field of view at a lower latency than other sensor data associated with another field of view of the sensor.

Z. The method as recited in paragraph Y, wherein altering the parameter of the sensor component further causes the sensor component to output the sensor data associated with the portion of the field of view at a higher frequency than the other sensor data.

AA. The method as recited in any one of paragraphs Y-Z, wherein outputting the sensor data at the higher frequency than the other sensor data comprises refraining from outputting the other sensor data for one or more consecutive cycles of the sensor.

BB. The method as recited in any one of paragraphs Y-AA, further comprising determining a priority associated with the region of interest, wherein outputting the sensor data at the lower latency than the other sensor data is based at least in part on the priority associated with the region of interest being greater than another priority associated with another region within the field of view of the sensor.

CC. The method as recited in any one of paragraphs Y-BB, wherein the priority associated with the region of interest is determined based at least in part on one or more of: a distance between the vehicle and the region of interest: a size of the region of interest: a planned trajectory of the vehicle: a presence of an object in the region of interest: map data associated with the environment: an occlusion in the region of interest: a speed of the vehicle: an occurrence of an event in the region of interest: or a location of the sensor in relation to the vehicle.

DD. The method as recited in any one of paragraphs Y-CC, wherein the first data is perception data and the region of interest is determined based at least in part on the perception data indicating a presence of an object within the region of interest.

EE. The method as recited in any one of paragraphs Y-DD, wherein the first data is localization data indicating a location and pose of the vehicle in the environment, the region of interest determined based at least in part on the location and pose of the vehicle.

FF. The method as recited in any one of paragraphs Y-EE, wherein the first data is planner data indicating a planned trajectory of the vehicle, the region of interest determined based at least in part on the planned trajectory.

GG. The method as recited in any one of paragraphs Y-FF, wherein the sensor is a rotating lidar sensor and determining the portion of the field of view that encompasses the region of interest comprises determining a range of azimuth angles associated with a partial scan of the rotating lidar sensor that encompasses the region of interest.

HH. The method as recited in any one of paragraphs Y-GG, wherein the sensor is a rolling shutter image sensor and the sensor data is image data.

II. One or more non-transitory computer-readable media storing instructions that, when executed, cause one or more processors to perform operations comprising: receiving first data associated with a vehicle operating in an environment, the vehicle configured to traverse the environment based at least in part on sensor data received from a sensor of the vehicle; determining a region of interest in the environment based at least in part on the first data; determining a portion of a field of view of the sensor that encompasses the region of interest; and altering a parameter of a sensor component associated with the sensor such that the sensor component outputs sensor data associated with the portion of the field of view at a lower latency than other sensor data associated with another field of view of the sensor.

JJ. The one or more non-transitory computer-readable as recited in paragraph II, wherein altering the parameter of the sensor component further causes the sensor component to output the sensor data associated with the portion of the field of view at a higher frequency than the other sensor data.

KK. The one or more non-transitory computer-readable as recited in any one of paragraphs II-JJ, the operations further comprising determining a priority associated with the region of interest, wherein outputting the sensor data at the lower latency than the other sensor data is based at least in part on the priority associated with the region of interest being greater than another priority associated with another region of interest within the field of view of the sensor.

LL. The one or more non-transitory computer-readable as recited in any one of paragraphs II-KK, wherein the priority associated with the region of interest is determined based at least in part on one or more of: a distance between the vehicle and the region of interest; a size of the region of interest: a planned trajectory of the vehicle: or a presence of an object in the region of interest.

MM. The one or more non-transitory computer-readable as recited in any one of paragraphs II-LL, wherein the first data is planner data indicating a planned trajectory of the vehicle, the region of interest determined based at least in part on the planned trajectory.

NN. The one or more non-transitory computer-readable as recited in any one of paragraphs II-MM, wherein the sensor is a rotating lidar sensor and determining the portion of the field of view that encompasses the region of interest comprises determining a range of azimuth angles associated with a partial scan of the rotating lidar sensor that encompasses the region of interest.

While the example clauses described above are described with respect to one particular implementation, it should be understood that, in the context of this document, the content of the example clauses can also be implemented via a method, device, system, computer-readable medium, and/or another implementation. Additionally, any of examples A-NN may be implemented alone or in combination with any other one or more of the examples A-NN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions that, when executed by the one or more processors, cause the system to perform operations comprising:
determining, based at least in part on a planned trajectory of a vehicle, a region of interest in an environment in which the vehicle is operating, the vehicle including a lidar sensor;
determining that a first field of view of the lidar sensor includes the region of interest and that a second field of view of the lidar sensor does not include the region of interest, wherein a complete field of view of the lidar sensor includes the first field of view of the lidar sensor and the second field of view of the lidar sensor;
receiving, during a scan cycle of the lidar sensor, a first portion of lidar data associated with the first field of view of the lidar sensor;
causing, prior to completion of the scan cycle of the lidar sensor, the first portion of the lidar data to be processed prior to receiving a second portion of the lidar data associated with the second field of view of the lidar sensor, wherein causing the first portion of the lidar data to be processed comprises sending the first portion of the lidar data to a perception component of the vehicle; and
at least one of confirming or modifying an operation of the vehicle based at least in part on causing the first portion of the lidar data to be processed.

2. The system of claim 1, wherein receiving the first portion of the lidar data comprises receiving one or more User Datagram Protocol (UDP) packets including the first portion of the lidar data, the one or more UDP packets being distinguishable from one or more additional UDP packets including the second portion of the lidar data.

3. The system of claim 1, the operations further comprising determining a range of azimuth angles associated with the region of interest, wherein determining that the first field of view of the lidar sensor includes the region of interest comprises determining that the first field of view of the lidar sensor corresponds to the range of azimuth angles.

4. The system of claim 1, wherein the region of interest is further determined based at least in part on at least one of a location of an object in the environment, a predicted trajectory of the object, an orientation of another sensor of the vehicle, or an event detected in the environment.

5. A method comprising:
receiving sensor data captured by a sensor of a vehicle that is operating in an environment, the sensor data being generated based on a partial scan cycle of the sensor and corresponding with a region of interest in the environment; and
based at least in part on the sensor data corresponding with the region of interest, initiating processing of the sensor data prior to receiving additional sensor data associated with a complete scan cycle by the sensor.

6. The method of claim 5, further comprising at least one of confirming or modifying an operation of the vehicle based at least in part on initiating processing of the sensor data.

7. The method of claim 6, wherein initiating processing of the sensor data generated based on the partial scan prior to receiving the additional sensor data reduces a latency associated with the at least one of the confirming or the modifying the operation of the vehicle than if the sensor data generated based on the partial scan were processed after receiving the additional sensor data.

8. The method of claim 5, wherein the sensor is a rotating lidar sensor and the sensor data is lidar data.

9. The method of claim 8, further comprising determining a range of azimuth angles that captures lidar data corresponding with the region of interest, and wherein the partial scan corresponds with the range of azimuth angles.

10. The method of claim 5, further comprising determining the region of interest in the environment based at least in part on a planned trajectory of the vehicle.

11. The method of claim 5, further comprising determining the region of interest in the environment based at least in part on at least one of a location of an object in the environment, a detected event in the environment, or an orientation of the sensor with respect to another sensor of the vehicle.

12. The method of claim 5, wherein the sensor is a rolling shutter image sensor, the sensor data is image data, and the partial scan cycle is associated with a portion of a frame of the image data.

13. The method of claim 5, wherein receiving the sensor data comprises receiving a first data packet including the sensor data, and wherein initiating processing of the sensor data prior to receiving the additional sensor data comprises causing the sensor data to be processed prior to receiving a second data packet including at least a portion of the additional sensor data.

14. The method of claim 5, wherein causing the sensor data to be processed comprises sending the sensor data to a perception component associated with the vehicle.

15. One or more non-transitory computer-readable media storing instructions that, when executed, cause one or more processors to perform operations comprising:
receiving sensor data captured by a sensor of a vehicle that is operating in an environment, the sensor data being generated based on a partial scan cycle of the sensor and corresponding with a region of interest in the environment; and
based at least in part on the sensor data corresponding with the region of interest, initiating processing of the sensor data prior to receiving additional sensor data associated with a complete scan cycle by the sensor.

16. The one or more non-transitory computer-readable media of claim 15, wherein the sensor is at least one of a rotating lidar sensor or a rolling shutter image sensor.

17. The one or more non-transitory computer-readable media of claim 16, wherein the sensor data is at least one of lidar data or image data.

18. The one or more non-transitory computer-readable media of claim 15, the operations further comprising determining, based at least in part on a planned trajectory of the vehicle, the region of interest in the environment.

19. The one or more non-transitory computer-readable media of claim 15, the operations further comprising determining the region of interest in the environment based at least in part on at least one of a location of an object in the environment, a detected event in the environment, or an orientation of the sensor with respect to another sensor of the vehicle.

20. The one or more non-transitory computer-readable media of claim 15, wherein receiving the sensor data comprises receiving a first data packet including the sensor data, and wherein initiating processing of the sensor data prior to receiving the additional sensor data comprises causing the sensor data to be processed prior to receiving a second data packet including at least a portion of the additional sensor data.

* * * * *